United States Patent
Schuler

[11] 4,123,141
[45] Oct. 31, 1978

[54] WINDOW SYSTEM COMPRISING LIGHT POLARIZERS

[75] Inventor: Norman W. Schuler, Lexington, Mass.

[73] Assignee: Polaroid Corporation, Cambridge, Mass.

[21] Appl. No.: 830,207

[22] Filed: Sep. 2, 1977

[51] Int. Cl.² ............ G05D 25/00; G02B 27/28
[52] U.S. Cl. .................................................. 350/159
[58] Field of Search ........... 350/1.6, 147, 153, 156–157, 350/159, 14–15, 111, 132, 276, 283; 351/49; 353/20; 250/225; 40/434, 548

[56] References Cited

U.S. PATENT DOCUMENTS

| | | | |
|---|---|---|---|
| 2,281,112 | 4/1942 | Ryan | 350/159 |
| 2,302,507 | 11/1942 | Ryan | 350/159 |

*Primary Examiner*—John K. Corbin
*Assistant Examiner*—Wm. H. Punter
*Attorney, Agent, or Firm*—Louis G. Xiarhos; Sheldon W. Rothstein

[57] ABSTRACT

A window construction adapted to permit or prevent light transmission including first and second fixed polarizer panels and a moveable panel between the polarizer panels comprising a polarizer and a wave retarder. The first fixed polarizer panel comprises adjacent polarizers which are in the same plane and have their absorption axes perpendicular to each other. The absorption axes of the polarizer panels are positioned so that maximum or minimum light transmission through the construction is effected by moving the panel including the wave retarder between the fixed polarizer panels.

5 Claims, 4 Drawing Figures

WINDOW SYSTEM COMPRISING LIGHT POLARIZERS

BACKGROUND OF THE INVENTION

This invention relates to a window construction capable of permitting or perventing light transmission. More particularly, this invention relates to a window construction which utilizes polarizer panels and a moveable wave retarder-polarizer panel to permit or prevent light transmission through the window.

It has been proposed in U.S. Pat. Nos. 3,528,722 and 3,663,089 to provide window structures including a fixed polarizer member and a rotatable polarizer member which permits regulation of light transmission through the window structure depending upon the position of the absorption axis of the rotatable polarizer relative to the position of the absorption axis of the fixed polarizer. These structures are useful in limited applications where windows of generally a circular shape are employed such as in airplane windows. However, such structures are undesirable in most windows which are rectangular or relatively large since a space larger than the windows would be necessary in order to permit rotation of the rotatable member. In addition, in larger windows, such as in the sunroof of an automobile or in building windows, the power requirements and housing requirements for a rotatable window mechanism would be undesirably expensive.

It is desirable to provide a window structure capable of preventing or permitting transmission of light which does not require space in addition to that occupied by the window viewing area. Furthermore, it is desirable to provide such a window structure which does not require the rotation of a window component to regulate light transmission.

SUMMARY OF THE INVENTION

This invention provides a window construction comprising a plurality of polarizer panels positioned in different planes including two fixed polarizer panels and a polarizer panel in a parallel plane and moveable between the fixed panels. The moveable polarizer panel includes a wave retarder on its surface exposed to incident light. The axes of absorption of the polarizer panels are positioned so that maximum and minimum light transmission through the structure can be effected by sliding the moveable panel between two extreme positions between the fixed panels. In one extreme position, the movable panel is superposed with one fixed polarizer panel and, in that position, light transmission through the structure is minimized. In the second extreme position, the moveable panel is superposed with both fixed polarizer panels and light transmission through the structure is maximized.

DETAILED DESCRIPTION OF SPECIFIC EMBODIMENTS

The window construction of this invention comprises a first fixed polarizer panel having two adjacent polarizers, in a common plane, whose light absorption axes are pendicular to each other; a second fixed polarizer panel in a parallel plane to the first polarizer panel and superposed with one of the adjacent polarizers comprising the first panel, its light absorption axis being perpendicular to the absorption axis of the polarizer with which it is superposed; and a moveable third polarizer panel between the fixed panels. The moveable panel also includes a wave retarder. The absorption axis of the polarizer of the moveable panel is perpendicular to the absorption axis of the polarizer of the first fixed panel which is not superposed with the second panel. The wave retarder of the moveable panel is positioned between the source of incident light and the movable panel polarizer.

Figure 1:
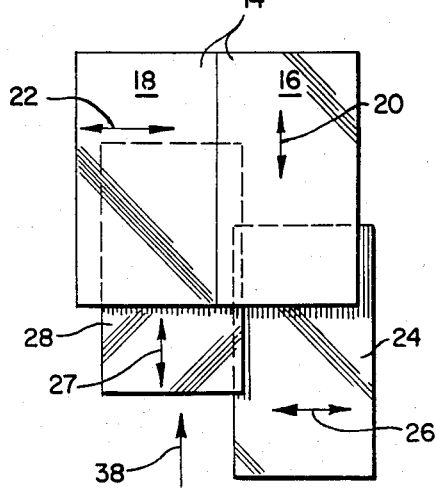
FIG. 1 is an exploded schematic of the present invention.

With reference to the exploded schematic of FIG. 1, fixed polarizer panel 14 comprises first polarizer 18 and adjacent second polarizer 16. Polarizers 16 and 18 are preferably laminated to common transparent support to form a single structural element. Their absorption axes are perpendicular to each other. Superposed with polarizer 16 is fixed third polarizer 24, which is in a parallel plane with panel 14 and generally coextensive in size with polarizer 16. The absorption axis of polarizer 24 is perpendicular to the absorption axis of polarizer 16. Movable panel 28 comprises a fourth polarizer 30 and a wave plate 32. Panel 28 is positioned in a parallel plane to panel 14 and is slidably mounted between panel 14 and fixed polarizer 24. Wave plate 32 is on the side of polarizer 30 closest to the source of incident radiation and is a ½, 3/2 or 5/2 wave or greater retarder with respect to a reference wave length within the visible spectrum as, for example, 540 mμ light. If the retarder is an odd one-half wave multiple up to five halves, it has the effect of twisting the electromagnetic vector of incident radiation by 90°. If the retarder provides greater than five half waves of retardation it essentially acts as a depolarizer and randomizes the electromagnetic vectors of the ordered polarized light incident on it. If a high order retarder is employed, one which retards on the order of 12 or more wave lengths of retardation is recommended. It makes no difference in the present invention if the wave plate twists the magnetic vector of incident light 90° or provides a depolarizing effect, which will be apparent in view of the further discussion.

If panel 28 is positioned superposed with polarizer 18, the wave plate has essentially no effect and light will not pass through the superposed polarizers because their absorption axes are normal. Since the absorption axes of polarizers 24 and 16 are also normal, the entire window structure is "closed" and light will not pass.

When panel 28 is interposed between polarizers 24 and 16, polarized light from polarizer 24 "sees" wave plate 32 and is either depolarized or its electromagnetic vector is twisted ninety degrees. In either event, much of the light passing through polarizer 24 will now pass freely through polarizers 30 and 16. Since incident light will freely pass through polarizer 18, the window structure is now "open."

The operation of the present invention will be described in greater particularity with reference to FIGS. 2-4 of the drawings. The window construction 10 includes a frame 12. A first polarizer panel 14 is secured to frame 12 and includes two polarizer sections 16 and 18 which are positioned so that their absorption axes are normal with respect to each other as indicated by arrows 20 and 22. The second polarizer panel 24 also is secured to frame 12 and includes a polarizer having its absorption axis normal to the absorption axis of superposed polarizer section 16 as indicated by arrow 26. A moveable polarizer panel 28 is positioned in a plane between polarizer panels 14 and 24 and is adapted to slide along track 29 in frame 12. The moveable polarizer panel 28 includes a polarizer 30 and a wave retarder 32 secured to transparent supports 34 and 36 by conventional means known to the art. (See FIG. 4) The absorption axis of polarizer 30 is normal to the absorption axis of polarizer panel 18 as indicated by arrow 37. The wave retarder 32 is positioned between the source of incident light 38 and the polarizer 30 for the reasons set forth herein. As noted the wave retarder can be one that twists the polarized light 90° or which completely depolarizes the incident light. The panel 28 can be moved by any conventional means including manually. One such conventional means shown in FIG. 2 includes an electric motor 40, a nut 41 attached to the top of plate 28 and a threaded shaft 42 which is rotated by the motor 40, which may be reversible. Stops 44 and 46 are attached to shaft 42 so that the panel 28 can be accurately superposed with either panel section 18 or panel sections 16 and 24.

Figure 2:
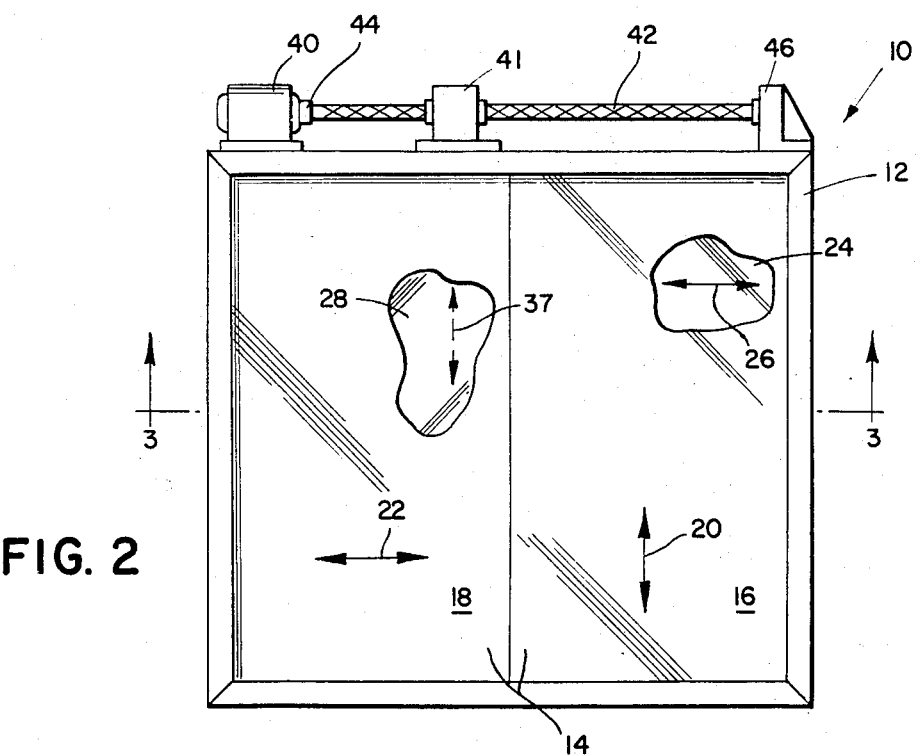
FIG. 2 is a bottom view of one embodiment of this invention.
Figure 3:
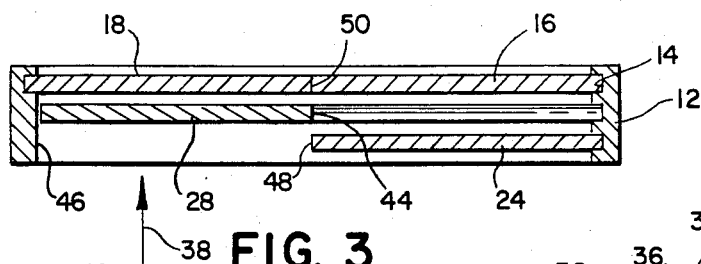
FIG. 3 is a cross-sectional view of the embodiment of FIG. 2 taken along line 3—3.
Figure 4:
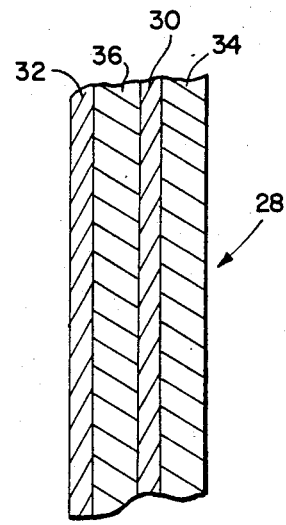
FIG. 4 is a sectional view of the moveable polarizer panel.

In operation, when the moveable panel 28 is in the position shown in FIGS. 2 and 3, light transmission through the window structure is minimized since the absorption axes of polarizer 30 and the polarizer in panel section 18 are normal to each other. Similarly, since the absorption axes of the polarizer in panel 24 and panel section 16 are normal, light transmission through the superposed panels 24 and panel section 16 is also minimized. When panel 28 is moved in a plane between panel 24 and panel section 16, panel section 18 is exposed directly to incident unpolarized light and transmission therethrough is maximized. Transmission through the superposed panels 24, 28 and 16 also is maximized since wave retarder 32 functions to twist the electromagnetic vector of the polarized light passing through panel 24 by ninety degrees or completely depolarizes the light, thereby permitting light transmission through polarizer 30 and the polarizer in panel section 16 whose absorption axes are parallel. Thus, it is evident that light transmission through the window structure of this invention can be maximized or minimized merely by virtue of moving panel 28 so that either of its edges 44 or 46 lines up with edge 48 of panel 24 and the abutting line 50 between polarizers 16 and 18.

Any suitable material which will produce the desired light-polarization effect may be utilized in the present invention. It has been found, however, that polymeric light-polarizing sheet material lends itself most readily to this function. The preferred material is a transparent plastic sheet of oriented polyvinylene deriving its light-polarizing properties essentially from conjugated double bonds. The manufacture and utilization of such sheet material may be appreciated with reference to U.S. Pat. Nos. 2,173,304; 2,255,940; 2,306,108; 2,379,231; 2,445,555; 2,453,168 and 2,674,159.

As a general rule, it may be stated that neither the polarizer nor the wave plate are structurally sufficiently rigid to be used by themselves. Therefore, in certain embodiments of the present invention, both the polarizer and wave plate may be laminated to one or more rigid synthetic plastic material strata such as, for example, cellulose acetate butyrate, polymethyl methacrylate, glass, etc. for support.

Any adhesive material suitable for bonding the wave plate and polarizer materials to support strata may be utilized as long as said adhesive does not hinder the transmission of light. Adhesives which may be used in the environment of the present invention generally comprise low molecular weight polyesters which are cross-linked in situ with a suitable cross-linking agent. Exemplary of such materials is Adcote 1069, sold by Morton Chemical Company, which is a low molecular weight polyethylene terephthalate material, probably hydroxyl terminated, in conjunction with a polyisocyanate cross-linking agent. Other polyester materials found suitable for this purpose are duPont Adhesive No. 46960 and National Starch Adhesives Nos. 76-2575, 30-9057 and 30-9066. These adhesives are, typically, polyesters utilized in conjunction with a suitable cross-linking agent, such as polyisocyanate. The adhesives may be used alone or applied in conjunction with other adhesives. The most preferred embodiments of the instant invention utilize a uniaxially oriented polyethylene terephthalate wave plate bonded directly, on each face, to layers of cellulose acetate butyrate with, preferably, one of the above-denoted National Starch adhesives using a standard pressure roll technique. The wave plate-cellulose acetate butyrate sandwich and a polarizer-cellulose acetate butyrate sandwich may then be laminated to each other, preferably using an adhesive which comprises approximately 4% cellulose nitrate whose viscosity is approximately 600 to 1,000 seconds$^{-1}$ dissolved in methyl methacrylate monomer and utilized with a di-isopropyl percarbonate catalyst present in amount of about one percent, by weight. This latter defined adhesive is further described in U.S. Pat. No. 3,719,544.

In the preferred embodiment, a hard surface coating may be utilized on any or all external surfaces thereof to provide a hard mar resistant surface. Preferred materials comprise melamine-formaldehyde condensation polymers, and particularly a polyalkylene glycol diester of an $\alpha$ $\beta$-unsaturated carboxylic acid, such as polyethylene glycol dimethacrylate, etc., which materials and techniques of application are disclosed in U.S. Pat. Nos. 2,397,242; 2,481,809; 3,019,131; 3,081,192 and 3,097,106.

The panel members which may be utilized with the present invention are generally between 0.25 and 0.5 inch in thickness. The wave plate utilized in the structure of the present invention is approximately 1.5 to 5 mils in thickness and preferably about 3 mils thick. If transparent synthetic plastic support materials are utilized in the composite structure, they will generally comprise methyl methacrylate approximately 50 to 125 mils in thickness and preferably about 60 mils thick. The transparent synthetic plastic protective layers of the instant invention will generally comprise cellulose acetate butyrate from 4 to 30 mils in thickness and preferably about 5 mils thick, and the light-polarizing element of the composite structure of the present invention will generally be from about 0.75 to 1.5 mils in thickness and preferably about 0.75 mils thick. A particularly suitable polarizer for use herein is available from Polaroid Corporation identified as K sheet polarizer, though iodine stained polarizer designated HN36 is also quite suitable.

Modifications can be made in the present invention that are conventional in the art and are considered included herein. Such modifications include adding ultraviolet light absorbers, infrared light absorbers and tinting compositions to the various components.

Since maximum transmission of light through the window of this invention is attained when one panel is interposed between the incident light and the viewer in one-half of the window, while three panels are interposed between the incident light and the viewer in the other half of the window, there will be a difference in light transmission through the structure. For example, with conventional HN 36 polarizer panels, the difference in light transmission between the 1 panel and the 3 superposed panels is about 14%. Therefore, a conventional tinting dye will preferably be included in the polarizer which is the only panel through which light passes when the window is "open" (polarizer 18) to equalize light transmission between both halves of the window structure.

While the preferred embodiment has been described, it will be appreciated that the size of the panel 24 polarizer may alternatively be coincident with the size of panel 14. Then in the open position, light will pass through two polarizers on one side (18 and 24) and three polarizers on the other (16, 24 and 30).

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A light polarizing window comprising:
   a first polarizing element having its absorption axis aligned in a predetermined direction;
   a second polarizing element in a substantially parallel plane and superposed with said first polarizing element and having its absorption axis normal to the absorption axis of the said first polarizing element;
   a third polarizing element adjacent to said second polarizing element and coincident with the plane of said second element, said third element having its absorption axis normal to the absorption of said second polarizing element; and
   a movable polarizing element slideably mounted between a first position where it is superposed with said third polarizing element and a second position where it is interposed between said first and second polarizing elements, said moveable polarizing element including a polarizer having its absorption axis normal to that of the third polarizing element and a wave retarder on its surface closest to a source of light incident on said moveable element, said retarder being on the order of $\frac{1}{2}$, 3/2, 5/2 or greater waves of retardation with respect to a reference wave length of the visible spectrum.

2. The window of claim 1 wherein the reference wavelength is 540 m$\mu$.

3. The window of claim 1 wherein said second and third polarizing elements are contiguous segments adhered to a common transparent panel.

4. The window of claim 1 wherein said third polarizing element is dyed to match the light absorption characteristics of the superposed first element, second element and moveable element.

5. The window of claim 1 positioned within the roof of an automobile including means for mechanically moving said moveable polarizing element from said first to said second position.

* * * * *